(12) United States Patent
Chakraborty et al.

(10) Patent No.: US 10,542,424 B2
(45) Date of Patent: *Jan. 21, 2020

(54) PLAUSIBLE OBFUSCATION OF USER LOCATION TRAJECTORIES

(71) Applicant: International Business Machines Corporation, Armonk, NY (US)

(72) Inventors: Supriyo Chakraborty, White Plains, NY (US); Raghu K. Ganti, Elmsford, NY (US); Mudhakar Srivatsa, White Plains, NY (US); Omer Tripp, Campbell, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

This patent is subject to a terminal disclaimer.

(21) Appl. No.: 15/800,247

(22) Filed: Nov. 1, 2017

(65) Prior Publication Data

US 2018/0302415 A1 Oct. 18, 2018

Related U.S. Application Data

(63) Continuation of application No. 15/489,903, filed on Apr. 18, 2017.

(51) Int. Cl.
*H04L 29/06* (2006.01)
*H04W 12/02* (2009.01)

(52) U.S. Cl.
CPC .................................. *H04W 12/02* (2013.01)

(58) Field of Classification Search
CPC ..... H04L 63/107; H04L 63/101; H04L 63/04; H04L 63/205; G06F 21/10; G06F 21/123;
(Continued)

(56) References Cited

U.S. PATENT DOCUMENTS 6,289,458 B1 9/2001 Garg
6,859,791 B1 2/2005 Spagna
(Continued)

OTHER PUBLICATIONS

Marius Wernke et al, A classification of location privacy attacks and approaches, Springer-Verlag (Year: 2012).*
(Continued)

*Primary Examiner* — Shanto Abedin
(74) *Attorney, Agent, or Firm* — Cantor Colburn LLP; Kevin Michael Jordan

(57) ABSTRACT

Aspects of the invention include receiving, using a processing system, an actual user location trajectory that includes a plurality of geographic locations of places visited by a user. It is determined that at least one of the plurality of places visited by the user has been identified as a sensitive place. An obfuscated user location trajectory is created that preserves the privacy of the sensitive places that is consistent with the actual user location trajectory that conforms to a valid street route on a map, preserves spatiotemporal correlation between geographic locations, and is consistent with geographic locations visited by the user in the past. Contents of the obfuscated user location trajectory are output to an application in place of contents of the actual user location trajectory.

7 Claims, 6 Drawing Sheets

(58) Field of Classification Search
CPC . H04W 12/02; H04W 4/025; G08G 1/096838
See application file for complete search history.

(56) References Cited

U.S. PATENT DOCUMENTS

| | | | |
|---|---|---|---|
| 7,591,020 | B2 | 9/2009 | Kammer |
| 8,069,142 | B2 | 11/2011 | Davis et al. |
| 8,427,979 | B1 | 4/2013 | Wang |
| 8,806,653 | B2 | 8/2014 | Dirienzo |
| 9,191,788 | B2 | 11/2015 | Somekh et al. |
| 9,342,783 | B1 | 5/2016 | Chang et al. |
| 9,390,228 | B2 | 7/2016 | Reid |
| 9,973,484 | B2 | 5/2018 | Reid |
| 2006/0179050 | A1 | 8/2006 | Giang et al. |
| 2010/0064373 | A1 | 3/2010 | Cai et al. |
| 2012/0309350 | A1 | 12/2012 | Kim |
| 2014/0379628 | A1* | 12/2014 | Agrawal ............ G06Q 10/107 706/48 |
| 2016/0093208 | A1* | 3/2016 | Duan ................... G01C 21/26 701/117 |
| 2016/0150361 | A1* | 5/2016 | Zhu ..................... G01S 19/14 455/456.1 |
| 2016/0275788 | A1* | 9/2016 | Wu ......................... G08G 1/04 |
| 2017/0083708 | A1 | 3/2017 | Braghin |
| 2018/0300503 | A1 | 10/2018 | Chakraborty et al. |
| 2018/0300505 | A1 | 10/2018 | Chakraborty et al. |
| 2018/0302413 | A1 | 10/2018 | Chakraborty et al. |

OTHER PUBLICATIONS

A. Ercument Cicek et al, Ensuring location diversity in privacy-preserving spatio-temporal data publishing, Springer-Verlag (Year: 2013).*

List of IBM Patents or Patent Applictions Treated as Related; (Appendix P), Filed Nov. 1, 2017, 2 pages.

Supriyo Chakraborty, et al., Pending U.S. Appl. No. 15/800,262 entitled "Deniable Obfuscation of User Locations," filed with the U.S. Patent and Trademark Office on Nov. 1, 2017.

A. Ercument Cicek et al., "Ensuring location diversity in privacy-preserving spatio-temporal data publishing", Springer-Beriag Berlin Heidelber, 2013, 17 pages.

Andres et al. "Geo-indistinguishability: Differential privacy for location-based systems." Proceedings of the 2013 ACM SIGSAC conference on Computer & communications security, 14 pages.

Damiani et al., . "The PROBE Framework for the Personalized Cloaking of Private Locations." Transactions on Data Privacy 3.2 (2010), 13 pages.

De Mulder et al. "Identification via location-profiling in GSM networks." Proceedings of the 7th ACM workshop on Privacy in the electronic society. ACM, 2008, 10 pages.

Hoh et al., "Protecting location privacy through path confusion." First International Conference on Security and Privacy for Emerging Areas in Communications Networks (SECURECOMM'05). IEEE, 2005, 12 pages.

Huang, et al. "Towards modeling wireless location privacy." International Workshop on Privacy Enhancing Technologies. Springer Berlin Heidelberg, 2005, 19 pages.

Johnson et al. "Context Evidence and Location Authority: the disciplined management of sensor data into context models." Proceedings of the first International Workshop on Context Modelling, Reasoning and Management at UbiComp. 2004, 6 pages.

List of IBM Patents or Patent Applictions Treated as Related; (Appendix P), 2 pages.

Meyerowitz et al., "Hiding stars with fireworks: location privacy through camouflage." Proceedings of the 15th annual international conference on Mobile computing and networking. ACM, 2009, 12 pages.

Pan et al., "Trace analysis and mining for smart cities: issues, methods, and applications." IEEE Communications Magazine 121 (2013), 7 pages.

Sachin B. Avaghade et al., Privacy Perserving for Spatio-Temporal Data Publishing Ensuring Location Diversity Using KAnonymity Technique, IEEE, 2015, 6 pages.

Shokri et al. "Protecting location privacy: optimal strategy against localization attacks." Proceedings of the 2012 ACM conference on Computer and communications security, 11 pages.

Theodorakopoulos et al. "Prolonging the hide-and-seek game: Optimal trajectory privacy for location-based services." Proceedings of the 13th Workshop on Privacy in the Electronic Society, ACM, 2014, 10 pages.

Tsai, "The impact of salient privacy information on decision-making" Diss. Carnegie Mellon University Pittsburgh, PA, 2009, 319 Pages.

V.S. Verykios et al., "Privacy and Security in Spatiotemporal Data and Trajectories", Springer-Verlag Berlin Heidelberg, 2008, 28 pages.

* cited by examiner

PLAUSIBLE OBFUSCATION OF USER LOCATION TRAJECTORIES

DOMESTIC PRIORITY

This application is a continuation of U.S. patent application Ser. No. 15/489,903, filed Apr. 18, 2017, the content of which is incorporated by reference herein in its entirety.

BACKGROUND

Embodiments of the invention relate in general to user location information, and more specifically to plausible obfuscation of user location trajectories.

SUMMARY

Embodiments of the invention include methods, systems, and computer program products for implementing plausible obfuscation of user location trajectories. A non-limiting example method includes receiving, using a processing system, an actual user location trajectory that includes a plurality of geographic locations of places visited by a user. It is determined that at least one of the plurality of places visited by the user has been identified as a sensitive place. An obfuscated user location trajectory is created that preserves the privacy of the sensitive places, is consistent with the actual user location trajectory that conforms to a valid street route on a map, preserves spatiotemporal correlation between geographic locations, and is consistent with geographic locations visited by the user in the past. Contents of the obfuscated user location trajectory are output to an application in place of contents of the actual user location trajectory.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
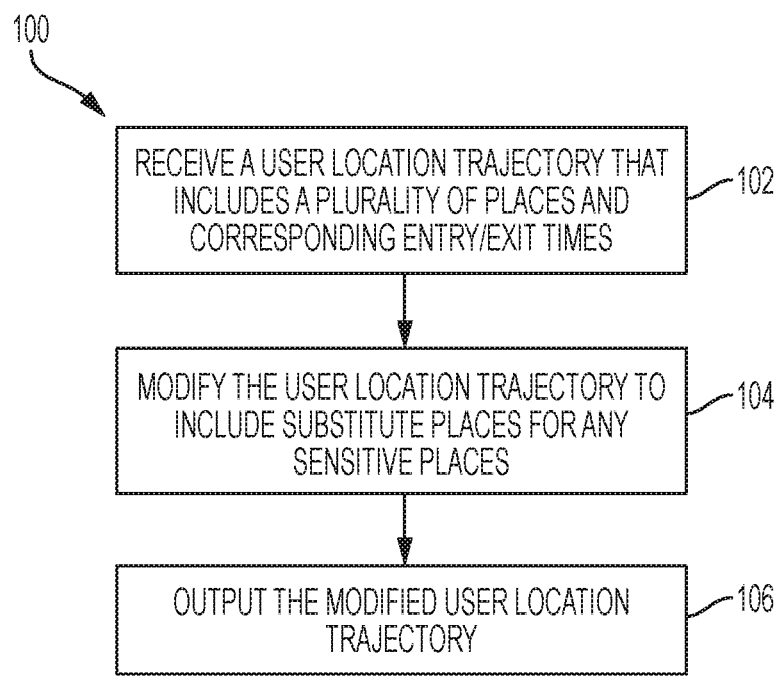
FIG. 1 is a flow diagram of a process for plausible obfuscation of user location trajectories in accordance with one or more embodiments of the invention.

One or more embodiments of the invention described herein provide plausible obfuscation of user location trajectories using generative machine learning models. Location trajectories are used by various location based applications to provide context aware mobile services to users. Examples of applications that can utilize user location trajectories include, but are not limited to lifelogging applications, recommendation service applications, and traffic modeling applications. User location trajectories can also convey information about behavioral habits of people (e.g., work, home, place of worship, social inclinations). Some of these behaviors are sensitive to users and from the user's perspective need to be protected from disclosure to third parties. Obfuscating location points within user location trajectories is one way to avoid releasing sensitive behavioral information. The very act of obfuscation can sometimes reveal information to the application about the user or disrupt its functioning. One or more embodiments of the invention described herein obfuscate user location trajectories such that the released trajectories satisfy privacy, and provide a substitute user location trajectory that is plausible and retains utility for location based applications. An obfuscated trajectory is private when after observing the obfuscated trajectory, the likelihood that a third-party thinks that the user has been in a sensitive location is bounded by a pre-defined privacy parameter "p" where p takes a value in the range [0, 1].

Contemporary approaches to hiding sensitive locations of a user from being output to third parties includes probabilistic suppression of location which results in hiding not only sensitive locations, but also non-sensitive ones with a particular probability. Another approach is spatiotemporal cloaking, where instead of a specific geographic position and timestamp being output, a larger geographic area and a time range is output to increase the uncertainty of localizing the user in a particular area. A further approach is adding noise to individual points in the trajectory. This approach includes adding noise drawn from a suitable probability distribution and adding it to the individual locations before release, or output, to distort the trajectory sufficiently from the original one.

A drawback to the above contemporary approaches is that the obfuscated trajectories generated using the above techniques fail to be plausible. In other words, the recipient is often aware, by inspection of the trajectory using, for example, other known public sources of information (e.g., traffic data, maps) that the trajectory has undergone obfuscation.

In accordance with one or more embodiments of the invention, a plausible obfuscated trajectory is generated. As used herein, the term "plausible obfuscated trajectory" can refer to an obfuscated trajectory that respects spatiotemporal correlation between location points (e.g., the trajectory includes the user at locations points at times that reflect the distance between the locations); conforms to a valid route on a map; takes into account traffic conditions and/or is consistent with roadway traffic patterns; and is consistent with user behavior in terms of places visited and/or the frequency with which they are visited.

In accordance with one or more embodiments of the invention described herein, a path generator is utilized to release an obfuscated location that can be either the actual location of the user or a fake location generated by the path generator. The path generator stores in memory the actual path of the user and the obfuscated trajectory that has been released thus far. A generative state-space based model can be trained offline using user location trajectories collected over time and thus the model is representative of the places a user typically visits. The model can further capture the relative frequency of visits using probability transitions between the places (e.g., using a transition matrix between states of the model). When a user moves from one place to another, the model is used to generate a route that preserves the privacy of the sensitive locations by not revealing that the user has been in any sensitive locations. In accordance with one or more embodiments of the invention, the alternate route is chosen such that it can be merged with the actual route of the user with minimum distortion, thus maximizing the usefulness of the released trajectory. The generated route, which is a combination of true and fake locations, is a valid user location trajectory as it preserves the spatiotemporal properties of a user location trajectory, it can be plotted on a map, and it meets the traffic and/or other time constraints imposed by various places (as they are also captured as part of the model).

As used herein, the term "user location trajectory" refers to a path that a user follows through a geographic space as a function of time. The path can be defined in terms of geographic location points such as, but not limited to geographic positioning system (GPS) points and latitude/longitude values. One or more of the location points can correspond to a specific place such as, but not limited to: the user's home, the user's place of work, a movie theater, a gas station, a hospital, and a library.

As used herein, the terms "path generator" refers to the block that takes as input user model, sensitive places, and actual place at which the user is currently in, and produces the next obfuscated location as output. The user model is a "generative state-space model" that can be used to sample alternate new paths, if required.

Turning now to FIG. 1, a flow diagram of a process 100 for plausible obfuscation of user location trajectories is generally shown in accordance with one or more embodiments of the invention. The processing shown in FIG. 1 can be performed, for example by a generative model operating on a processor. At block 102, a user location trajectory is received that includes a plurality of geographic points that represent geographic locations visited by a user. One or more of the geographic locations can correspond to a specific place, such as, but not limited to the user's home, the user's office, a coffee shop, gym, or a library. In accordance with one or more embodiments of the invention, for each place in the in the user location trajectory, a timestamp that represents an entry time when the user first entered the geographic location corresponding with the place, and a timestamp that represents an exit time when the user moved to a new geographic location not corresponding to the place are also received.

At block 104, the user location trajectory is modified such that the obfuscated location trajectory satisfies the privacy condition defined on the sensitive places. Sensitive places are places which the user does not want a third-party to believe that a user has visited beyond what is specified by the privacy definition. Sensitive places can be defined by the user or be automatically generated based on, for example, similarity to places that the user has defined as sensitive and/or places that other users have defined as sensitive. In accordance with one or more embodiments of the present invention, when at least one of the geographic locations in the actual user location trajectory has been determined to correspond to a place that has been previously identified as a sensitive place an obfuscated user location trajectory is created.

In accordance with one or more embodiments of the present invention, the obfuscated user location trajectory satisfies the privacy condition specified in terms of the sensitive locations, is consistent with the actual user location trajectory, conforms to a valid street route on a map, preserves spatiotemporal correlation between geographic locations, and is consistent with geographic locations visited by the user in the past. In accordance with one or more embodiments of the present invention, the obfuscated user location trajectory is consistent with the actual user location trajectory when there is minimum distortion between the two. One way to define distortion is in terms of the number of places that are dissimilar between the two trajectories. In accordance with one or more embodiments of the present invention, the spatiotemporal correlation between geographic locations is preserved when there exists a valid route between successive places that occur in the obfuscated trajectory. Paths that are consistent in terms of their spatiotemporal correlation can be obtained by sampling any valid path from the user In accordance with one or more embodiments of the present invention, the obfuscated user location trajectory is consistent with past traffic patterns of the user, an amount of time spent by the user in the past at geographic locations included in the alternate user location trajectory, and/or a time of day that the user visited geographic locations included in the alternate user location trajectory in the past.

In accordance with one or more embodiments of the present invention, the obfuscated user location trajectory is created based at least in part on a model of past actual user location trajectories that include geographic locations of places visited by the user in the past, and the creating includes replacing portions of the user location trajectory with portions of the past user location trajectories.

At block 106, the modified user location trajectory is output to an application. In accordance with one or more embodiments of the present invention, entry and exit times for each of the geographic locations in the alternate user location trajectory are also output to the application.

Figure 2:
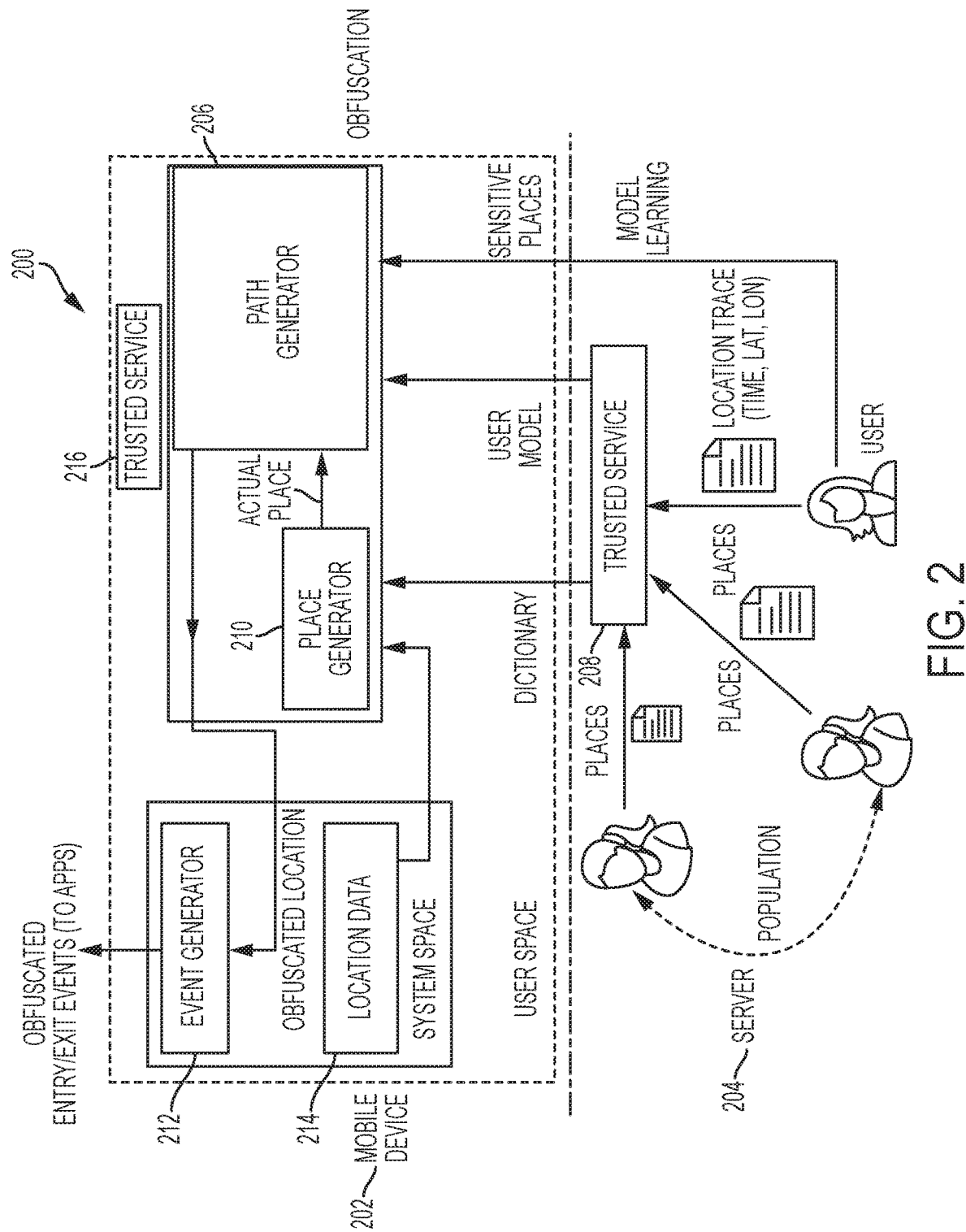
FIG. 2 is block diagram of a system for implementing plausible obfuscation of user location trajectories in accordance with one or more embodiments of the invention.

Turning now to FIG. 2, a block diagram of a system 200 for implementing plausible obfuscation of user location trajectories is generally shown in accordance with one or more embodiments of the invention. The embodiment shown in FIG. 2 includes a server component 204 and a mobile device component 202. In accordance with one or more embodiments of the invention, the server 204 and the mobile device 202 are communicatively coupled via a network. As shown in FIG. 2, model learning is performed at the server 204 and it includes collecting, by a trusted server 208, location trace data about places that the user, and other users in a selected population, have traveled in past. The selected population can have demographics that are similar to the user such as, but not limited to: age, occupation, and/or gender. As used herein, the term "trusted server" refers to a computer that is trusted by the user to not leak information about the offline trajectories that are used for computing the user model to another third-party.

As shown in FIG. 2, the trusted server 208 collects the location trace data and generates a user model (e.g., a Markov model with each node representing a place) that is input to a trusted service 216 located on the mobile device 202. Also as shown in FIG. 2, geographic locations of places are identified by the user and the selected population (e.g., in terms of latitude and longitude) and input to the trusted server 208. The trusted server 208 can then output the places as a dictionary of places which is used by the place generator 210 to identify places based on latitude and longitude location data 214. Also as shown in FIG. 2, the user can identify sensitive places which are input the trusted service 216. The trusted service 216 shown in FIG. 2 includes a place generator 210 and a path generator 206. As used herein, the term "trusted service" refers to a software component that can run inside a phone and does not leak the inputs or output to a third-party.

As shown in FIG. 2, location data 214 is received (e.g., from a GPS located on the mobile device 202) and sent to the place generator 210 to see if the current actual location of the user corresponds to a defined place. If the location data 214 corresponds to a place, then the actual place is input to the path generator 206 which generates an obfuscated location(s), or place(s) which are part of an obfuscated user location trajectory. In accordance with one or more embodiments of the present invention, the obfuscated location can be the same as the actual location depending on whether the actual user location trajectory includes sensitive places. The obfuscated location is input to the event generator 212. In accordance with one or more embodiments of the invention, the event generator 212 takes as input the obfuscated location generated by the path generator and annotates it with either the time entry or the time of exit to a place. A location annotated with the time of entry or time of exit can be defined as an event. In this manner, obfuscated entry and exit events can be output by the event generator 212 to location based and other applications.

Figure 3:
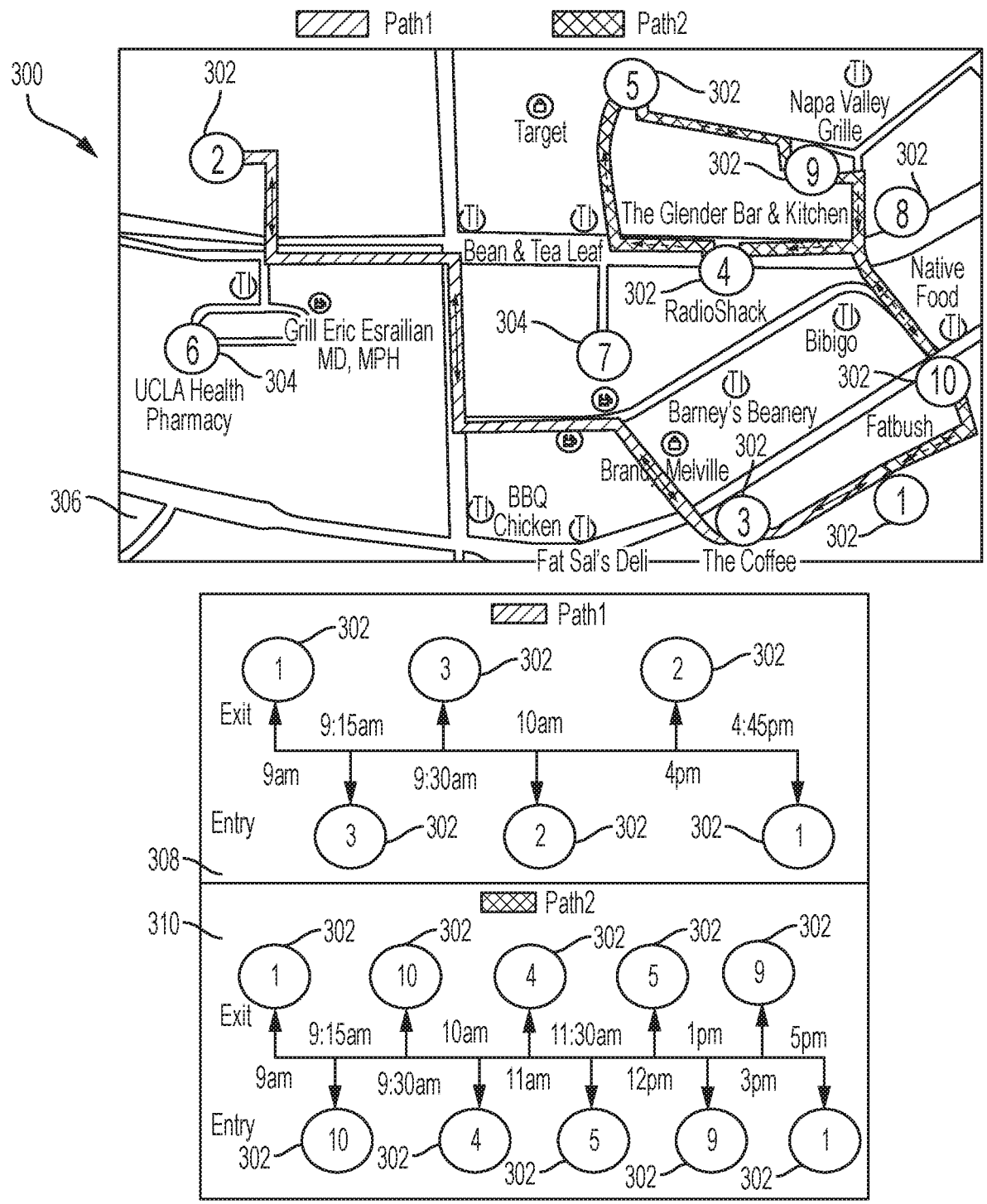
FIG. 3 is a block diagram of actual user trajectories and their corresponding released spatiotemporal events in accordance with one or more embodiments of the invention.

Turning now to FIG. 3, a block diagram 300 of actual user trajectories and their corresponding released spatiotemporal events is generally shown in accordance with one or more embodiments of the invention. The actual user trajectories are shown in box 306 of FIG. 3. Box 306 includes eight non-sensitive places 302, labeled 1-5 and 8-10 and two sensitive place labeled 6-7. In one example, the place 302 labeled "1" is the user's home, the place 302 labeled "2" is a school, the place 302 labeled "3" is a café, the place 302 labeled "4" is an electronics store, the place 302 labeled "5" is a grocery store, the place 304 labeled "6" is a hospital, the place 304 labeled "7" is a movie theater, the place 302 labeled "8" is a mall, the place 302 labeled "9" is a restaurant, and the place 302 labeled "10" is an ice cream shop. Box 308 of FIG. 3 shows that each of the actual places visited by the user in the user location trajectory of path 1, which does not include any sensitive places 304, are output (e.g., by event generator 212 to an application) along with exit/entry events such as time of entry and time of exit of each place 302. Box 310 of FIG. 3 shows that each of the actual places visited by the user in the user location trajectory of path 2, which does not include any sensitive places 304, are output along with exit/entry events such as time of entry and time of exit of each place 302.

Figure 4:
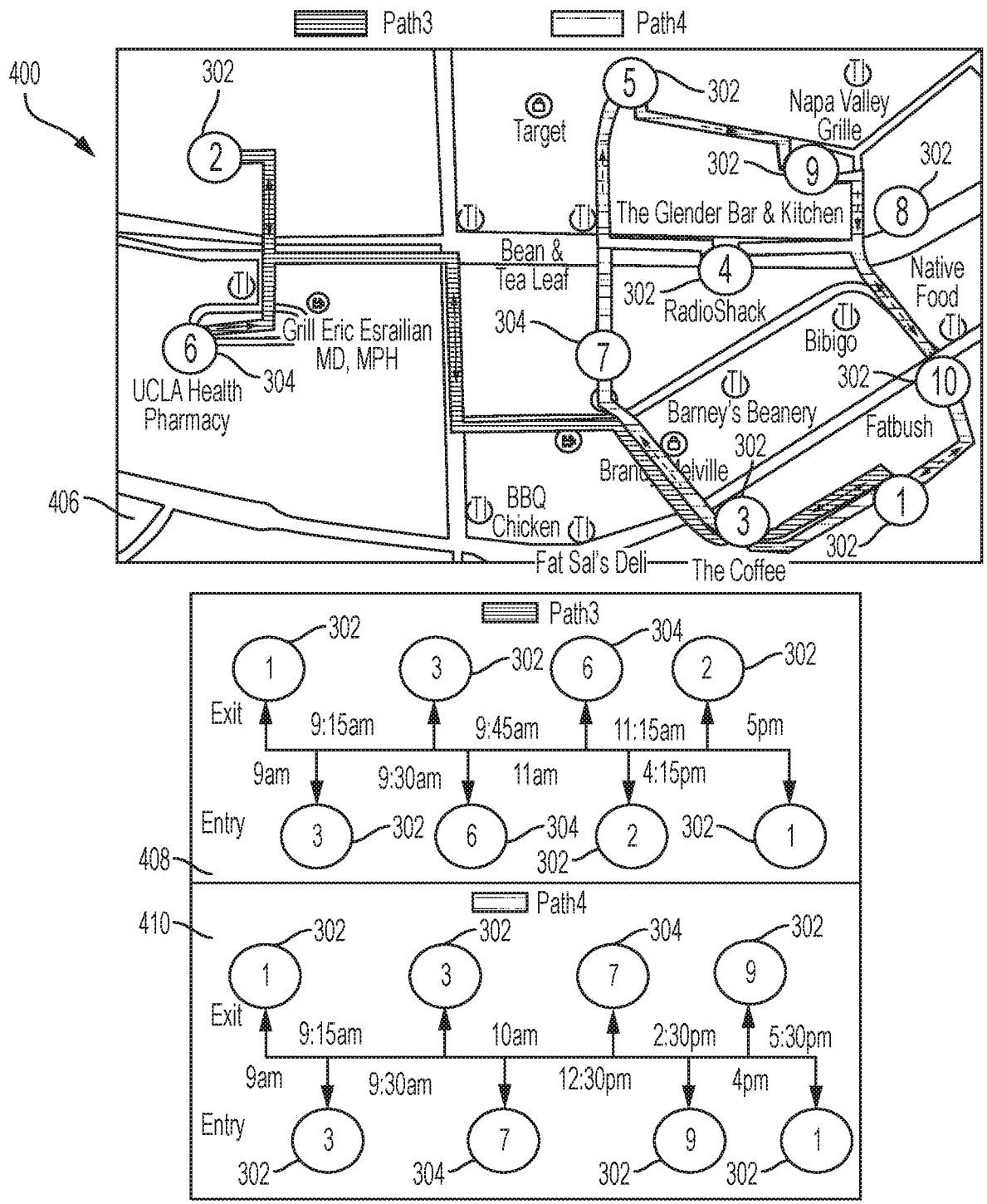
FIG. 4 is a block diagram of actual user trajectories that include sensitive places and their corresponding privacy-unaware released spatiotemporal events in accordance with one or more embodiments of the invention.

Turning now to FIG. 4, a block diagram 400 of actual user trajectories that include sensitive places and their corresponding privacy-unaware released spatiotemporal events is generally shown in accordance with one or more embodiments of the invention. The actual user trajectories are shown in box 406 of FIG. 4. Similar to box 306 in FIG. 3, box 406 in FIG. 4 includes eight non-sensitive places 302, labeled 1-5 and 8-10 and two sensitive place labeled 6-7. Box 408 of FIG. 4 shows that each of the actual places visited by the user in the user location trajectory of path 3, which does include the sensitive place 304 labeled "6", are output along with exit/entry events corresponding to the sensitive place 304 labeled "6". Box 410 of FIG. 4 shows that each of the actual places visited by the user in the user location trajectory of path 4, which does include the sensitive place 304 labeled "7", are output along with exit/entry events corresponding to the sensitive place 304 labeled "6".

Figure 5:
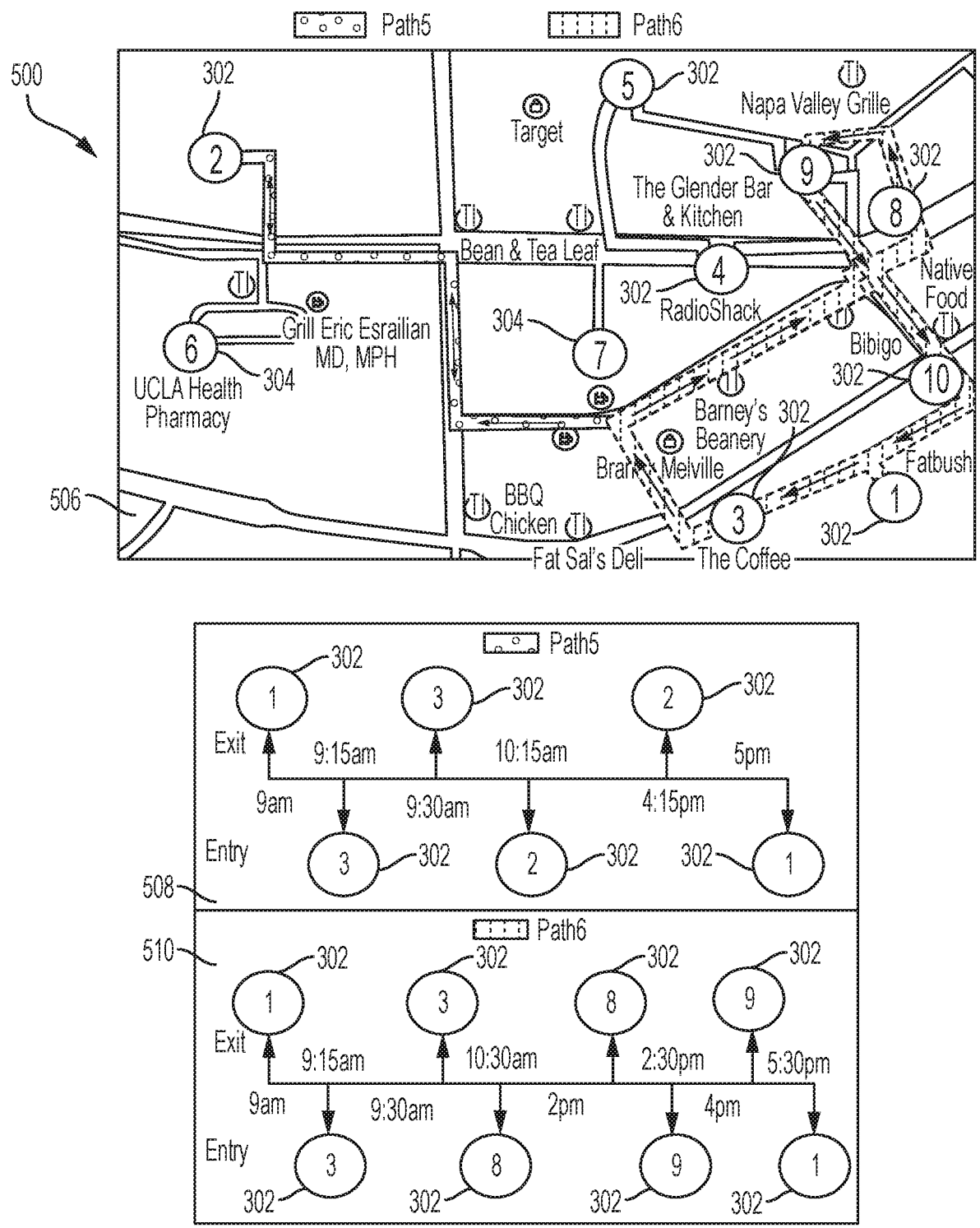
FIG. 5 is a block diagram of a possible reconstructions of user trajectories that do not include sensitive places and their corresponding released spatiotemporal events in accordance with one or more embodiments of the invention.

Turning now to FIG. 5, a block diagram 500 of possible reconstructions of user location trajectories that do not include sensitive places and their corresponding released spatiotemporal events is generally shown in accordance with one or more embodiments of the invention. Box 506 of FIG. 5 depicts possible substitute user location trajectories for the actual user location trajectories of paths 3 and 4 in box 406 of FIG. 4. Similar to box 406 in FIG. 4, box 506 in FIG. 5 includes eight non-sensitive places 302, labeled 1-5 and 8-10 and two sensitive place labeled 6-7. Box 508 of FIG. 5 shows a possible substitute user location trajectory labeled "path 5" that can be used in place of the actual user location trajectory labeled "path 3" in FIG. 4 to obfuscate the user visit to the sensitive place 304 labeled "6." As shown in box 508, the substitute user location trajectory eliminates the sensitive place 304 and adjusts the entry time to the non-sensitive place 302 labeled "2". The substitute user location trajectory shown in box 508 can be output as obfuscated entry/exit events to applications. As the user moves from one location to another, for every new location, the path generator 206 can execute the following: it predicts the most likely path that can be taken by the user (e.g., by using the user model and the set of actual locations that the user has visited so far); it generates a set of paths that have the same prefix as the obfuscated trajectory that has been released thus far, that preserve the privacy of the sensitive location, and that have minimum distortion with the predicted path; a path is then randomly chosen from this set; and a location from the selected path is released as the obfuscated location.

Box 510 of FIG. 5 shows a possible substitute user location trajectory labeled "path 6" that can be used in place of the actual user location trajectory labeled "path 4" in FIG. 4 to obfuscate the user visit to the sensitive place 304 labeled "7." As shown in box 510, the substitute user location trajectory eliminates the sensitive place 304 and adds in two additional non-sensitive places 302 labeled "8" and "9". The substitute user location trajectory shown in box 510 can be output as obfuscated entry/exit events to applications.

In accordance with one or more embodiments of the present invention, user location trajectories are obfuscated. The obfuscating can include generating fake and plausible location trajectories where sensitive locations visited by the user cannot be inferred with any certainty. The sensitive locations can be specified by the user. The obfuscated user location trajectories can maximize the number of actual locations visited by the user to ensure minimum geographic distortion when compared to the actual user location trajectory. A probabilistic model can be generated to allow computation of the transition probabilities between places and that can maintain time-dependent transition probabilities, information about dwelling time, and travel time at and between places respectively. The probabilistic model can be used for predictions and inferences about locations forward and backward in time.

Figure 6:
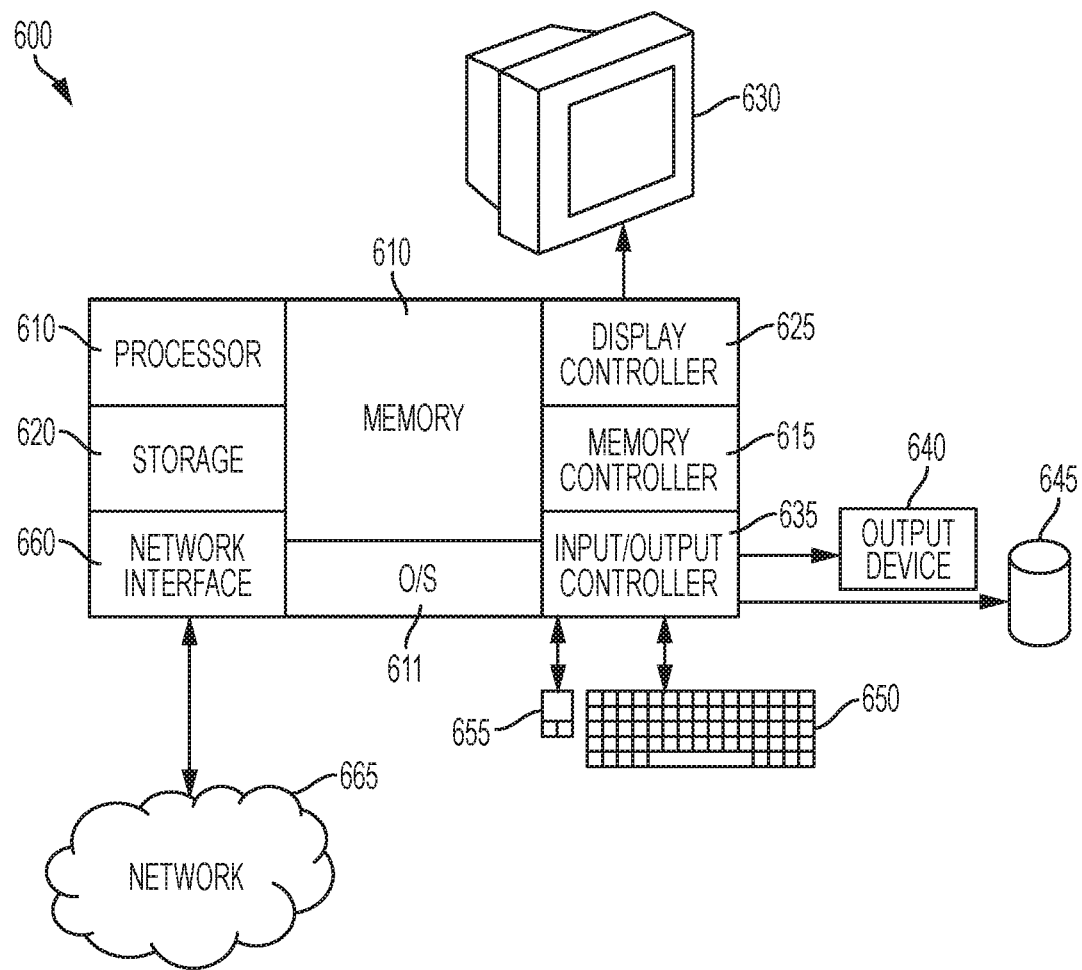
FIG. 6 is a block diagram of a computing device for implementing some or all aspects of a system for implementing plausible obfuscation of user location trajectories in accordance with one or more embodiments of the invention.

Turning now to FIG. 6, a block diagram of a computer system 600 for use in implementing some or all aspects of a system for implementing plausible obfuscation of user location trajectories is generally shown according to one or more embodiments of the invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 600, such as a personal computer, workstation, minicomputer, or mainframe computer.

In an exemplary embodiment, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. A conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor based microprocessor (in the form of a microchip or chip set), a macroprocessor, or other device for executing instructions. The processor 605 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid state drive. The stored instructions in memory 610 or in storage 620 may include those enabling the processor to execute one or more aspects of the dispatch systems and methods of this disclosure.

The computer system 600 may further include a display controller 625 coupled to a display 630. In an exemplary embodiment, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In an exemplary embodiment, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Technical effects and benefits of embodiments of the invention include the ability to obfuscate user location trajectories to remove user specified sensitive places, and to provide a substitute user location trajectory that is plausible and retains utility for location based applications.

The terminology used herein is for the purpose of describing particular embodiments of the invention only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments of the invention were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, using a processing system, an actual user location trajectory that includes a plurality of geographic locations of places visited by a user;
determining that at least one of the plurality of places visited by the user has been identified as a sensitive place, wherein the determining is performed automatically by the processing system based at least in part on a similarity of the sensitive place to a previously identified sensitive place;
modifying the actual user location trajectory to create an obfuscated user location trajectory that includes a substitute place instead of the sensitive place, is consistent with the actual user location trajectory, conforms to a valid street route on a map, preserves spatiotemporal correlation between geographic locations, and is consistent with geographic locations visited by the user in the past; and
outputting, to an application, contents of the obfuscated user location trajectory in place of contents of the actual user location trajectory.

2. The computer-implemented method of claim 1, wherein the contents of the obfuscated user location trajectory includes entry and exit times for each place in the obfuscated user location trajectory.

3. The computer-implemented method of claim 1, wherein the creating is based at least in part on a model of past user location trajectories that include geographic locations visited by the user in the past, and the creating includes replacing portions of the actual user location trajectory with portions of the past user location trajectories.

4. The computer-implemented method of claim 1, wherein the obfuscated user location trajectory is consistent with roadway traffic patterns.

5. The computer-implemented method of claim 1, wherein the obfuscated user location trajectory is consistent with an amount of time spent by the user in the past at places included in the obfuscated user location trajectory.

6. The computer-implemented method of claim 1, wherein the obfuscated user location trajectory is consistent with a time of day that the user visited places included in the obfuscated user location trajectory in the past.

7. The computer-implemented method of claim 1, wherein the previously identified sensitive place is identified by the user.

* * * * *